INVENTORS.
JACK L. CUNNINGHAM &
ROGER SNELLMAN
BY
ATTORNEY

INVENTORS.
JACK L. CUNNINGHAM &
ROGER SNELLMAN
BY.
ATTORNEY 3,316,111
BRICK FOR IMPROVED SERVICE LIFE IN CERTAIN
FERRUGINOUS ENVIRONMENTS
Roger Snellman, Birmingham, Mich., and Jack L. Cunningham, Pittsburgh, Pa., assignors to Harbison-Walker Refractories Company, Pittsburgh, Pa., a corporation of Pennsylvania
Filed May 17, 1965, Ser. No. 457,253
4 Claims. (Cl. 106—65)

This invention relates to improved refractory brick for use in ferruginous environments. In a particular embodiment, it is concerned with tar impregnated, ceramically bonded brick in the high alumina class especially suited for use in iron ladles.

The American Society for Testing Materials (ASTM) divides "high alumina brick" into four different classes; namely, the 50% alumina class, the 60% alumina class, the 70% alumina class, and the 80% alumina class. The present invention is concerned with but a portion of these three classes, i.e. burned high alumina brick having an $Al_2O_3$ content minimum of about 55%, by weight. The upper limit of this class is about 75% $Al_2O_3$, by weight.

In certain ferruginous environments, such as the blast furnace and various molten iron ladles and the like transfer vessels, it has been the practice to line the interior of the shell with selected fireclay refractories. In many instances, the lining practice included zone arrangements wherein, depending upon location in the vessel, super duty and high duty fireclay, semisilica, etc., brick would be installed in various zones depending upon the expected vessel operating conditions.

Fireclay refractories have long been highly regarded for use in such as the blast furnace, because of their good resistance to abrasion and alkali attack, and resistance to the corrosive action of blast furnace slags. However, as a result of the evolution of certain modern iron and steel manufacturing processes, the need has arisen for a substitute for fireclay refractory brick.

Prior successful brick for fabricating the lining of an iron ladle have been characterized by very extensive expansion in service over their exposed surfaces. The expansion has been compared by some to resemble the way a loaf of bread puffs out of a pan when it is baked, at least over the exposed surfaces of the brick. In the past, an iron ladle lining of such an expanding-type fireclay brick was maintained at a more or less constant temperature, or else it was allowed to cool down at a relatively slow and even rate. However, in contemporary steelmaking practices and, in particular, processes which include a basic oxygen steelmaking furnace, and in which hot metal (molten iron) is moved from a blast furnace for charging basic oxygen furnace vessels—when one understands the great speed with which the oxygen steelmaking produces steel, it will be seen that there is much more severe service for iron transfer ladles than, for example, with prior open hearth furnace steelmaking processes. This change from the open hearth to the basic oxygen furnace process has been too drastic for more conventional iron transfer vessels to stand. Physical abuse is just to much.

An example of the drastic reduction in lining life, resultant from change in iron-making practice, is a Treadwell ladle in use in a certain large steel plant in the United States. A superior super duty fireclay refractory (having an $Al_2O_3$ content in the range of 40–45% and a porosity in the range of 7–12%, approximately) used to give or provide a lining campaign of around 100,000 tons of hot metal; this was considered economical and satisfactory service. With contemporary increases in molten metal temperatures and greater basicity because of changes in slagging practice, the service life with this fireclay brick fell as low as 35,000 tons per campaign. To overcome this problem, one, of course, thinks of increasing the refractoriness of the material which is used as the lining in the vessel.

Increasing the alumina content suggests itself as one way to increase refractoriness. However, higher alumina content in the brick, while increasing the refractoriness, results in a brick having many inferior properties, at least in ferruginous environments of type discussed herein. The porosity of the brick of higher alumina content is higher; for example, as high as 21%. The higher alumina content brick are more susceptible to alkali attack. Whereas fireclay brick—in the presence of ferruginous slags—tend to expand and "glaze over" to provide their own substantially impervious, monolithic exterior surface, such does not appear to be the case with higher alumina-content brick. The "glaze," which appears on the fireclay brick, is the reaction product of brick constituents and slag. With this glaze coating, there is no zone of alternation through the brick behind that glazed surface. In high alumina brick there is a zone of alteration. The slags and metal attack the matrix of the high alumina brick, eating it away without forming any protective layer. As the matrix is progressively eaten away, the larger particles in the brick fall off into the metal bath.

Accordingly, it is an object of this invention to provide a burned, high alumina refractory brick of about 55 to 75% $Al_2O_3$ content and of sufficient refractoriness for use in certain modern ferruginous environments, which brick are characterized by elimination or substantial suppression of those shortcomings previously encountered with high alumina brick in such ferruginous atmospheres.

It is a specific object of the invention to provide a ceramically bonded, high alumina brick of $Al_2O_3$ content in the range of about 55 to 75%, which brick is characterized by a porosity in the range 12 to 21%, and which is saturated throughout with a selected, nonaqueous, carbonaceous material. The brick is essentially non-shrinking, i.e. it is volume stable at operating temperatures or else it expands. The carbonaceous material amounts to about 5–10%, by weight, of the brick, based on the weight of the refractory material in the brick.

Contemporary workers in the art, while becoming increasingly aware of the lessening adequacy of fireclay-type refractories in ferruginous environments, have not been able to effectively modify its characteristics sufficient to meet the increased demands of modern iron and steelmaking processes. Merely increasing the alumina content to 50 or 55% has not been the answer, and for more than one reason; but, primarily because the expense in enriching a fireclay brick mix with alumina or bauxite or the like disadvantageously increased the price of the raw materials, and still only produced a product having fireclay characteristics. True, refractoriness was increased, but overall ability to increase service life to that obtained in the past with fireclay refractories was not obtained.

A few years ago, as described in British patent specification No. 817,446 published July 29, 1959, it was suggested that treatment of fireclay materials to deposit coke in internal pore structure would increase the life in the presence of molten ferruginous material. No doubt because of the dense and nonporous structure of fireclay brick, the impregnant suggested was of low melting or softening point, i.e. in the range 30 to 70° C., so it could be made sufficiently fluid for an impregnation treatment. This British specification (apparently because of the low melting point) required that, after impregnation, contained pitch should be cokified.

In one very recent service installation, such a low melting point coal tar pitch-type material was used to impregnate a brick of 70% alumina content and the resulting brick were used in a molten iron transfer vessel. This vessel lining was only slightly better, i.e. a matter of less than ten heats, than previous fireclay brick linings. In this test, the low temperature pitch impregnant was not cokified.

In further actual field tests, ceramically bonded high alumina brick of 70% $Al_2O_3$ content were impregnated throughout with medium pitch. Medium pitch is defined in the are as pitch having a melting point in the range about 150–250° F., as distinguished from soft pitches of the type referred to in the British specification, above noted, which are usually stated to melt in the range 80–150° F. (The point range specifically disclosed in the British specification is, converting to the Fahrenheit temperature scale, about 86 to 158° F.) These brick were substituted for high duty fireclay brick in a ferruginous environment. The high duty brick, having an $Al_2O_3$ content on the order of 40%, had been providing a campaign of about 8 heats. The 70% alumina content brick of this invention, in four subsequent campaigns, provided 20 heats, 15 heats, 21 heats, and 19 heats. The 15-heat campaign was not the result of failure of the tar-impregnated brick of this invention but, rather, because of failure elsewhere in the lining which caused scrapping of the entire lining.

The high alumina refractory shapes of this invention containing between 55 and 75% $Al_2O_3$, by weight on an oxide analysis, can be made by blending various high alumina refractory materials. For example, alumina contents between 55 and 75% can be made by blending various materials of the group including Baer process alumina, calcined South American bauxite (88% $Al_2O_3$), calcined Alabama bauxite (74% $Al_2O_3$), calcined diaspore (76% $Al_2O_3$), calcined Burley diaspore (58% $Al_2O_3$), kyanite (56% $Al_2O_3$). All of these materials are chemically compatible. Further adjustments in alumina content can be accomplished by including minor amounts of fireclay, clay, or silica.

It should be understood that when ferruginous environment is herein mentioned, it is meant to include the blast furnace, ladles for holding and transferring molten iron, any associated conduits, and the like.

Exemplary oxide analysis of brick according to this invention is as folows:

| | Percent |
|---|---|
| $Al_2O_3$ | 55–75 |
| $TiO_2$, CaO, MgO, $Fe_2O_3$, alkalies | Up to 10 |
| $SiO_2$ | Remainder |

The brick of this invention can be made according to conventional brickmaking practices in which the high alumina materials are ground, screened, and blended to give the desired alumina content and the brickmaking size graded range of particles. The screen sizing is, of course, variable, according to techniques well known to those skilled in the art. Broadly, however, from 40–60% of the total refractory batch is in the range —4+6 mesh, with the remainder passing a 65 mesh screen. From 40 to 60% of the material passing a 65 mesh screen also passes a 325 mesh screen. There are substantially no submicron size particles, i.e. one would not expect more than 5%, by weight, of the total batch to be particles less than 1 micron in diameter. The size graded batch is tempered with a conventional tempering agent. Examples of such well known tempering agents are water, lignin liquor and water mixtures, or lignin liquor alone, aqueous solutions of various inorganic materials such as the chromates, sulfates, molasses, tall oil, and the like.

The brick are burned at usual high alumina firing temperatures; for example, about 2820° F. After firing and cooling, the brick are impregnated with heated, fluid, medium pitch. It is preferred that the brick be heated to a temperature in the range about 200–400° F. and maintained at this temperature for the impregnation process, in order to assure complete impregnation throughout all internal pore structure thereof. The impregnation can be carried out, for example, by submerging the brick in a bath of molten pitch for about two hours.

The following example is illustrative of a preferred embodiment of the invention:

Example I

Calcined kaolin, calcined bauxite, and ball clay are combined in such proportions as to yield a batch analyzing, on an oxide basis, about 60%, by weight, $Al_2O_3$ and the balance $SiO_2$, with small amounts of $TiO_2$, $Fe_2O_3$, CaO, MgO, and alkalies. The components are crushed and thoroughly blended together to give a typical brickmaking grind, such as the following:

| | Percent |
|---|---|
| —3+10 mesh | 20 |
| —10+28 mesh | 30 |
| —28+65 mesh | 10 |
| —65 mesh [1] | 40 |

[1] 40 to 60% of the —65 mesh material being —325 mesh.

About 4 to 6%, by weight, of a 50:50 weight mixture of water and lignin liquor, as a temporary binder, is added to the batch. The mix is then pressed into brick on a mechanical brick press, 9 x 4½ x 2½″ brick at about 4000 p.s.i. The shapes are removed from the press and oven dried at about 230° F. for about 12 hours. The brick are then fired for about 10 hours at about 2730° F.

The fired brick are placed in a bath of molten medium pitch for about two hours.

Brick, of the type above discussed under Example I, were covered with coke breeze, as were samples of comparable nontar-impregnated brick and placed in a reducing atmosphere in a laboratory test kiln. Blast furnace slag of the following chemical analysis [1] was dripped onto the surface of each of the test brick over a period of three hours. At the end of threee hours, the specimens were removed and the size and volume of the resulting erosion cavities were measured. The tar impregnated brick were far superior.

Example II

Calcined bauxite, calcined flint, and ball clay are mixed in such proportions to yield a batch analyzing, on an oxide basis, about 71% $Al_2O_3$ and the balance $SiO_2$, with small amounts of $TiO_2$, $Fe_2O_3$, CaO, MgO, and alkalies. The batch is processed and formed into fired brick as in Example I. The fired brick are impregnated by immersing them in a molten tar bath at 400° F., until they are completely impregnated. The Brick are tested, as in Example I, and similar results are obtained.

Example III

Calcined diaspore and a mixture of calcined rough and crude flint clay are mixed in such proportions to yield a batch analyzing, on an oxide basis, about 62% $Al_2O_3$ and the balance $SiO_2$, with small amounts of the various oxides specified in Examples I and II. The batch is formed into brick as in Example I, and impregnated in the manner set forth in Example II. The resulting brick are tested as in Example I, with similar results.

---

[1] TYPICAL ANALYSIS OF BLAST FURNACE SLAG

| | Percent |
|---|---|
| Silica ($SiO_2$), about | 35.00 |
| Iron oxide ($Fe_2O_3$) | 0.80 |
| Calcia (CaO) | 37.00 |
| Magnesia (MgO) | 14.60 |
| Manganese ($MnO_2$) | 0.60 |
| Soda ($Na_2O$) | 0.28 |
| Potash ($K_2O$) | 0.63 |
| Lithia ($Li_2O$) | 0.03 |
| Alumina ($Al_2O_3$) | 11.06 |
| | 100.00 |

Example IV

Additional brick were made up which had about a 71% alumina content. The brick were made according to the teachings of United States Patent No. 3,067,050, in which calcined alumina and volatilized silica were in the fines to thereby form, by in situ reaction, a fine crystalline mullite matrix. The coarse fraction could be predominantly characterized as mullite. Manufacturing techniques and testing procedures similar to those discussed for the others above were used. Superior results were again obtained for tar-impregnated as compared to nontar-impregnated, otherwise identical brick.

Example V

Additional brick were made according to United States Patent No. 3,067,050, but in which the alumina content was 90% and the coarse fraction was substantially all high purity synthetic alumina grain. Surprisingly, in comparative tests, the nonimpregnated brick were superior to the impregnated brick.

Example VI

Still additional brick were manufactured having only 42% $Al_2O_3$. Again, the manufacturing techniques and testing procedures were conventional and as discussed relative to the foregoing examples. The nontar-impregnated brick seemed to be little different from the impregnated ones. In attempting physical measurements of erosion, it was shown that the tar-impregnated brick had 4.4 cubic inches eroded in the test and the nontar-impregnated one had 4.6 cubic inches eroded.

It is believed reference to the drawings will even more dramatically illustrate the remarkable discovery represented by the present invention. In these drawings:

FIGS. 1A and 1B are photographs of cut sections through brick according to Example I, and in which FIG. 1A is a nontar-impregnated one and FIG. 1B is a tar-impregnated one. Physical measurements of volume erosion show a 60% improvement in erosion resistance for the tar-impregnated brick of about 60% $Al_2O_3$ content.

FIGS. 2A and 2B are photographs of cut sections through brick according to Example II. FIG. 2A is the nontar-impregnated sample and FIG. 2B is the tar-impregnated sample and FIG. 2B is the tar-impregnated one. As can be seen by studying FIG. 2A, the slag penetrated through the brick and resulted in an almost sponge-like interior. In fact, slag came out underneath the front surface of the brick.

FIGS. 3A and 3B are the sample brick according to Example III. These are also photographs of cut sections through tar-impregnated and nontar-impregnated brick, FIG. 3A being the nontar-impregnated one, and FIG. 3B being the tar-impregnated one. The improvement obtained by impregnation is obvious. Physical measurement of volume erosion indicated on the order of 42% improvement by the tar impregnation.

FIG. 4A is the nontar-impregnated specimen, and FIG. 4B is the tar-impregnated one; and the degree of improvement in resisting erosion by blast furnace slag is dramatically shown by the photographs.

FIGS. 5A and 5B are cut sections through specimen brick according to Example V, in which FIG. 5A is the nontar-impregnated brick, and FIG. 5B is the tar-impregnated one. A comparison of these photographs shows the utterly unexpected result that impregnation in a 90% alumina brick decreased its resistance to blast furnace slag.

FIGS. 6A and 6B are cut sections through specimens according to Example VI, and in which FIG. 6A is the nontar-impregnated one, and FIG. 6B is the tar-impregnated one. These photographs indicate that tar-impregnation of this relatively low $Al_2O_3$ content brick, aptly termed "fireclay" brick, provided insignificant improvement.

Figure 1A:
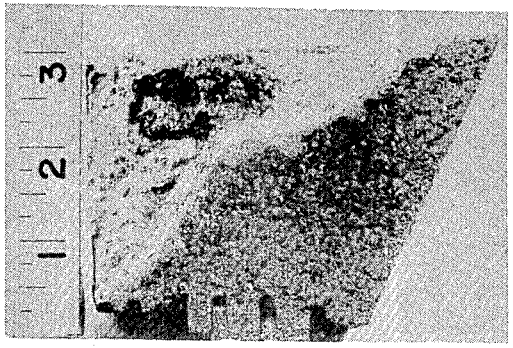
Figure 1B:
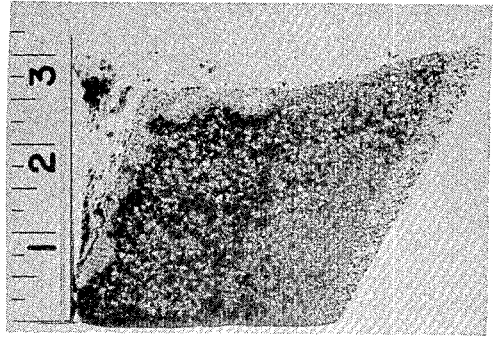
Figure 2A:
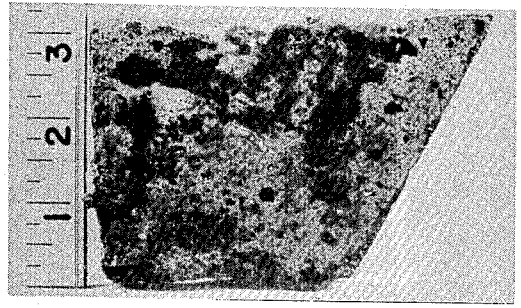
Figure 2B:
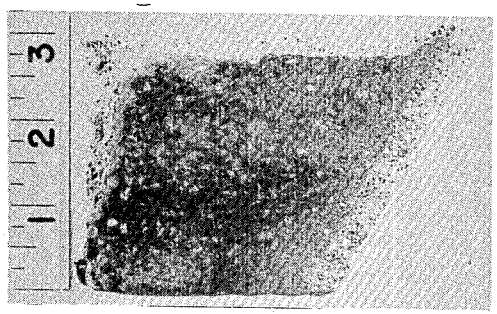
Figure 3A:
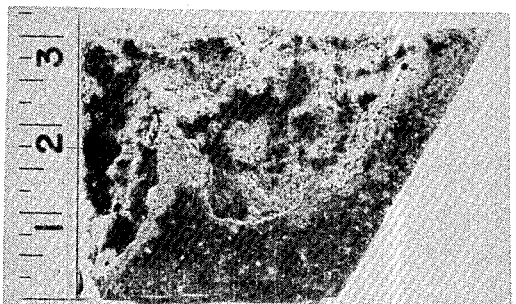
Figure 3B:
Figure 4A:
FIGS. 4A and 4B are cut sections through the brick of Example IV.
Figure 4B:
Figure 5A:
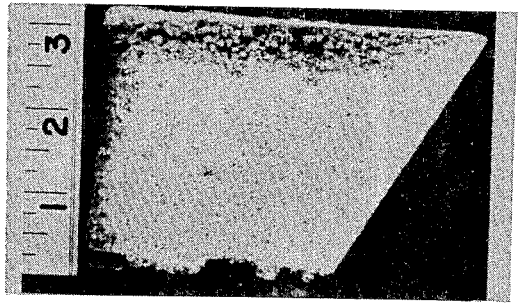
Figure 5B:
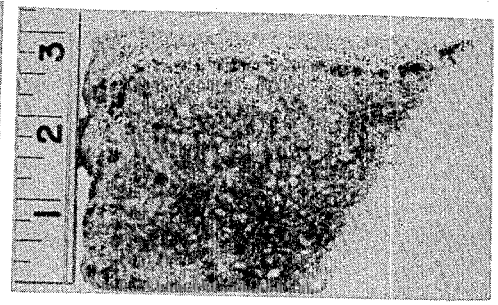
Figure 6A:
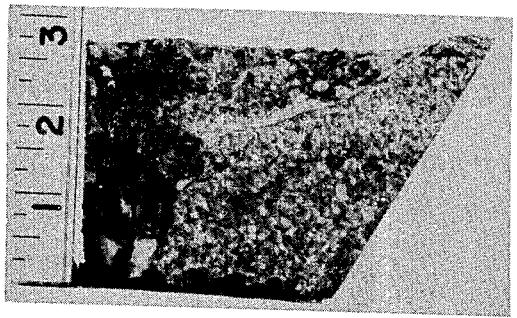
Figure 6B:

All materials analyses are on an oxide basis in the foregoing discussion, in conformity with the normal practice of reporting the chemical content of refractory materials. All size grading is according to the Tyler series of screens, unless otherwise specified.

Having thus described the invention in detail and with sufficient particularity as to enable those skilled in the art to practice it, what is desired to have protected by Letters Patent is set forth in the following claims.

We claim:
1. In a metallurgical chamber for contact with ferruginous material at elevated temperatures, a refractory lining, which is resistant to wetting and penetration by the slags of ferruginous metallurgical processes, said lining consisting essentially of burned, non-shrinking, high alumina brick which analyze, on the basis of an oxide analysis, from at least 55 to 75%, by weight, of $Al_2O_3$, there being up to 10% of oxides other than $SiO_2$, the remainder of the brick being $SiO_2$, said brick being impregnated throughout with medium pitch.

2. A non-shrinking high alumina refractory brick which is resistant to wetting and penetration by the slags of ferruginous metallurgical processes, said high alumina refractory brick analyzing, on the basis of an oxide analysis, from at least 55 to 75%, by weight, of $Al_2O_3$, there being up to 10% of oxides other than $SiO_2$, the remainder of the brick being $SiO_2$, said brick being impregnated throughout with medium pitch.

3. A non-shrinking high alumina refractory brick which is resistant to wetting and penetration by the slags of ferruginous metallurgical processes, said high alumina refractory brick analyzing, on the basis of an oxide analysis, about 60%, by weight, of $Al_2O_3$, there being up to 10% of oxides other than $SiO_2$, the remainder of the brick being $SiO_2$, said brick being impregnated throughout with medium pitch.

4. A non-shrinking high alumina refractory brick which is resistant to wetting and penetration by the slags of ferruginous metallurgical processes, said high alumina refractory brick analyzing, on the basis of an oxide analysis, from at least 55 to 75%, by weight, of $Al_2O_3$, there being up to 10% of oxides other than $SiO_2$, the remainder of the brick being $SiO_2$, said brick being impregnated throughout with medium pitch, said brick having a porosity in the range about 12–21%.

References Cited by the Examiner
UNITED STATES PATENTS
3,067,050  12/1962  Miller _____ 106—65

FOREIGN PATENTS
817,446  7/1959  Great Britain.

HELEN M. McCARTHY, *Primary Examiner.*
TOBIAS E. LEVOW, *Examiner.*
J. E. POER, *Assistant Examiner.*